(12) United States Patent
Wilson et al.

(10) Patent No.: US 10,894,665 B2
(45) Date of Patent: Jan. 19, 2021

(54) HIGH ANGLE CONVEYOR WITH SELF-ADJUSTING INFLECTION ZONE ASSEMBLY

(71) Applicant: Joy Global Conveyors Inc, Winfield, AL (US)

(72) Inventors: Andrew Wilson, Chester-le Street (GB); Gavin Wilson, Whitley Bay (GB); Stevie Kim Nix, Winfield, AL (US); Larry Ned Atkinson, Winfield, AL (US)

(73) Assignee: JOY GLOBAL CONVEYORS INC, Winfield, AL (US)

( * ) Notice: Subject to any disclaimer, the term of this patent is extended or adjusted under 35 U.S.C. 154(b) by 0 days.

(21) Appl. No.: 16/561,758

(22) Filed: Sep. 5, 2019

(65) Prior Publication Data
US 2020/0071081 A1 Mar. 5, 2020

Related U.S. Application Data

(60) Provisional application No. 62/727,399, filed on Sep. 5, 2018.

(51) Int. Cl.
*B65G 15/16* (2006.01)
*B65G 15/08* (2006.01)
(Continued)

(52) U.S. Cl.
CPC .............. *B65G 15/16* (2013.01); *B65G 15/08* (2013.01); *B65G 15/22* (2013.01); *B65G 39/14* (2013.01); *F16F 1/121* (2013.01)

(58) Field of Classification Search
CPC ........ B65G 15/14; B65G 15/18; B65G 15/16; B65G 21/10; B65G 15/22; B65G 15/08; F16F 1/121
(Continued)

(56) References Cited

U.S. PATENT DOCUMENTS 2,257,351 A * 9/1941 Silver .................... B65G 15/14
198/550.4
2,695,701 A 11/1954 Hagenbook
(Continued)

FOREIGN PATENT DOCUMENTS

CN 88100575 A 8/1988
CN 1042879 A 6/1990
(Continued)

OTHER PUBLICATIONS

Search Report issued by the United Kingdom Intellectual Property Office for Application No. 1912793.5, dated Feb. 12, 2020 (4 pages).
(Continued)

*Primary Examiner* — Mark A Deuble
(74) *Attorney, Agent, or Firm* — Michael Best & Friedrich LLP

(57) ABSTRACT

A high angle conveyor includes a first conveyor belt, a second conveyor belt, a first idler roller engaged with the first conveyor belt, the first idler roller being coupled to a first pivot frame, and a second idler roller engaged with the second conveyor belt, the second idler roller being coupled to a second pivot frame. The first conveyor belt and the second conveyor belt define an inflection point between the first idler roller and the second idler roller. The first and second pivot frames are pivotable from an initial position toward an expanded position in response to a lump of material larger than a specified capacity of the high angle conveyor passing through the inflection point.

20 Claims, 9 Drawing Sheets

(51) Int. Cl.
*B65G 15/22* (2006.01)
*F16F 1/12* (2006.01)
*B65G 39/14* (2006.01)

(58) Field of Classification Search
USPC ....................................................... 198/814
See application file for complete search history.

(56) References Cited

U.S. PATENT DOCUMENTS

| | | | |
|---|---|---|---|
| 2,966,254 A | 12/1960 | Kaiser | |
| 3,262,545 A | 7/1966 | Worsencroft | |
| 3,682,294 A | 8/1972 | Milek | |
| 4,099,712 A | 7/1978 | Martin | |
| 4,214,744 A | 7/1980 | Evans | |
| 4,433,774 A | 2/1984 | Lopes | |
| 4,457,422 A * | 7/1984 | Hurd | B65G 15/14 198/604 |
| 4,561,537 A | 12/1985 | Dos Santos | |
| 4,564,189 A | 1/1986 | Noll, Jr. | |
| 4,565,281 A | 1/1986 | Kramer | |
| 4,566,586 A | 1/1986 | Robertson | |
| 4,609,097 A | 9/1986 | Dos Santos | |
| 4,732,267 A | 3/1988 | Schober | |
| 4,982,835 A | 1/1991 | Butler et al. | |
| 5,165,314 A | 11/1992 | Paulson et al. | |
| 5,186,310 A * | 2/1993 | Winchester | B65G 15/14 198/626.5 |
| 5,193,423 A | 3/1993 | Bakker | |
| 5,320,471 A | 6/1994 | Grathoff | |
| 5,435,433 A * | 7/1995 | Jordan | B65G 15/14 198/626.3 |
| 5,875,697 A | 3/1999 | Cole et al. | |
| 6,264,022 B1 | 7/2001 | Petack et al. | |
| 6,484,870 B2 | 11/2002 | Bohnker et al. | |
| 6,626,283 B2 | 9/2003 | McBride | |
| 6,793,454 B2 | 9/2004 | Brizzi | |
| 7,000,759 B1 | 2/2006 | Jones | |
| 8,910,778 B1 * | 12/2014 | Francisco | B65G 39/16 198/814 |
| 9,884,729 B1 | 2/2018 | Nix | |
| 10,071,860 B2 | 9/2018 | Kahrger et al. | |
| 2003/0047424 A1 | 3/2003 | Monahan et al. | |
| 2003/0192776 A1 * | 10/2003 | Sousek | F16H 7/1209 198/814 |
| 2006/0108206 A1 | 5/2006 | Kotaki et al. | |
| 2009/0166159 A1 | 7/2009 | Murayama | |
| 2014/0311868 A1 * | 10/2014 | Pribyl | B65G 15/16 198/620 |
| 2015/0075207 A1 | 3/2015 | Karikusa et al. | |
| 2016/0083188 A1 * | 3/2016 | Pribyl | B65G 17/06 198/850 |
| 2017/0225899 A1 | 8/2017 | Smith | |
| 2017/0362040 A1 | 12/2017 | Wetters et al. | |

FOREIGN PATENT DOCUMENTS

| | | | | |
|---|---|---|---|---|
| CN | 102358489 A | | 2/2012 | |
| CN | 203581795 U | | 5/2014 | |
| CN | 203767461 U | | 8/2014 | |
| JP | 60148805 A | * | 8/1985 | ............. B65G 15/24 |
| JP | S60148806 A | | 8/1985 | |
| JP | H10175713 A | | 6/1998 | |
| JP | H10226411 A | | 8/1998 | |
| RU | 2184693 C2 | | 7/2002 | |
| RU | 2455216 C2 | | 7/2012 | |
| SU | 491550 A1 | | 11/1975 | |
| WO | 2007131692 A1 | | 11/2007 | |

OTHER PUBLICATIONS

C-KIT, "Sandwich Conveyors—Functional Description", <http://www.ckit.co.za/secure/conveyor/sandwich/sandwich_basics_funcdescript.html>, 2015, 3 pages.

Conveyor, "Spring Tension Support on Conveyor Belt: How to Build a Conveyor Belt, How to Make a Mini Conveyor Belt, How to Make a", <http://www.wcre.us/conveyor_plant/3314.html>, 2015, 9 pages.

Dos Santos et al., "Open-Pit Mining: Evolution of Sandwich Belt High-Angle Conveyors", Papers: Evolution of a Sandwich Belt, <http://www.ckit.co.za/secure/conveyor/papers/sandwich/evolution/evolution.html>, 2015, 22 pages.

Joy Global, "HAC System—High Angle Conveyor Product Overview", HAC System Product Overview Brochure, 2015, 3 pages.

* cited by examiner

HIGH ANGLE CONVEYOR WITH SELF-ADJUSTING INFLECTION ZONE ASSEMBLY

CROSS REFERENCE TO RELATED APPLICATIONS

The present patent application claims priority to U.S. Provisional Patent Application No. 62/727,399, filed on Sep. 5, 2018, the entire content of which is hereby incorporated by reference.

BACKGROUND

The present disclosure relates to high angle conveyors, and particularly to high angle conveyors with inflection zones.

SUMMARY

The present disclosure provides, in one aspect, a high angle conveyor including a first conveyor belt, a second conveyor belt, a first idler roller engaged with the first conveyor belt, the first idler roller being coupled to a first pivot frame, and a second idler roller engaged with the second conveyor belt, the second idler roller being coupled to a second pivot frame. The first conveyor belt and the second conveyor belt define an inflection point between the first idler roller and the second idler roller. The first and second pivot frames are pivotable from an initial position toward an expanded position in response to a lump of material larger than a specified capacity of the high angle conveyor passing through the inflection point.

The present disclosure provides, in another aspect, a self-adjusting inflection zone assembly for a high angle conveyor including a first conveyor belt and a second conveyor belt. The self-adjusting inflection zone assembly includes a first frame, a first idler roller coupled to the first frame, the first idler roller engaged with the first conveyor belt, a second frame, and a second idler roller coupled to the second frame, the second idler roller engaged with the second conveyor belt. At least one of the first frame or the second frame is pivotable from an initial position toward an expanded position to increase a spacing between the first frame and the second frame.

The present disclosure provides, in another aspect, a high angle conveyor including a first conveyor belt, a second conveyor belt, a first idler roller engaged with the first conveyor belt, the first idler roller being coupled to a first frame, and a second idler roller engaged with the second conveyor belt, the second idler roller being coupled to a second frame. The first conveyor belt and the second conveyor belt define an inflection point between the first idler roller and the second idler roller. The first frame and the second frame are positioned on opposite sides of the inflection point, and at least one of the first frame or the second frame is pivotable from an initial position toward an expanded position.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
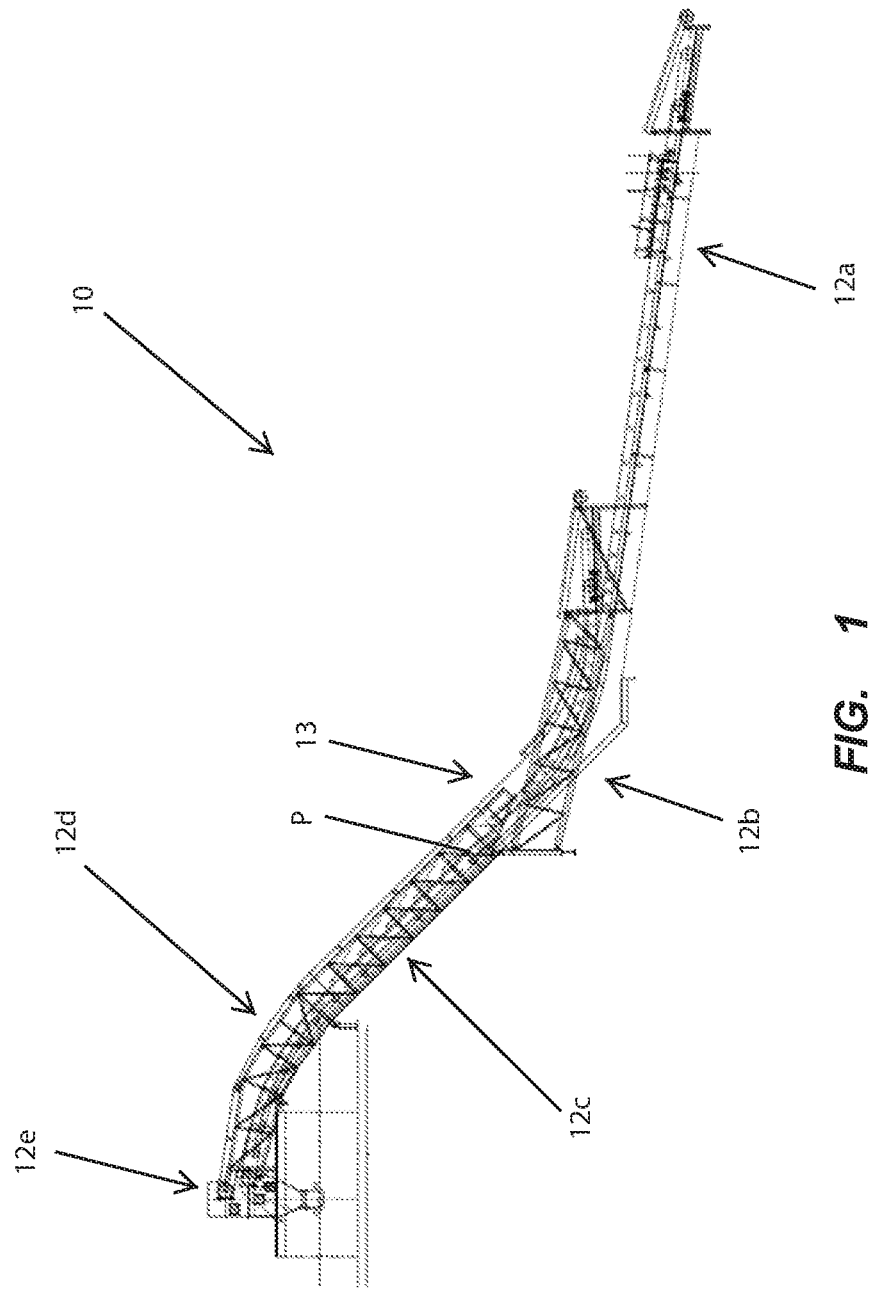
FIG. 1 is a side schematic view of a high angle conveyor according to one embodiment of the present disclosure.

FIG. 1 illustrates a high angle conveyor 10 according to one embodiment. The illustrated high angle conveyor 10 includes a loading section 12a, a first transition section 12b, a straight section 12c, a second transition section 12d, and a discharge section 12e. The loading section 12a receives material, and the high angle conveyor 10 conveys the material to the discharge section 12e. The slope of the high angle conveyor 10 increases in the first transition section 12b to the straight section 12c, such that the high angle conveyor 10 defines a "concave up" curve in the first transition section 12b. The slope of the high angle conveyor 10 is constant along the straight section 12c, then the slope of the high angle conveyor 10 decreases in the second transition section 12d to the discharge section 12e. Thus, the high angle conveyor 10 defines a "concave down" curve in the second transition section 12d.

The high angle conveyor 10 includes an inflection zone 13 between the first transition section 12b and the second transition section 12d. The inflection zone 13 contains an inflection point P at which the curvature of the high angle conveyor 10 reverses (i.e. changes between concave up and concave down). The illustrated high angle conveyor 10 includes a single inflection point P, but the high angle conveyor 10 can be configured differently. As such, it should be understood that in other embodiments, the high angle conveyor 10 may include multiple inflection zones 13 and inflection points P located anywhere along the high angle conveyor 10.

Figure 2:
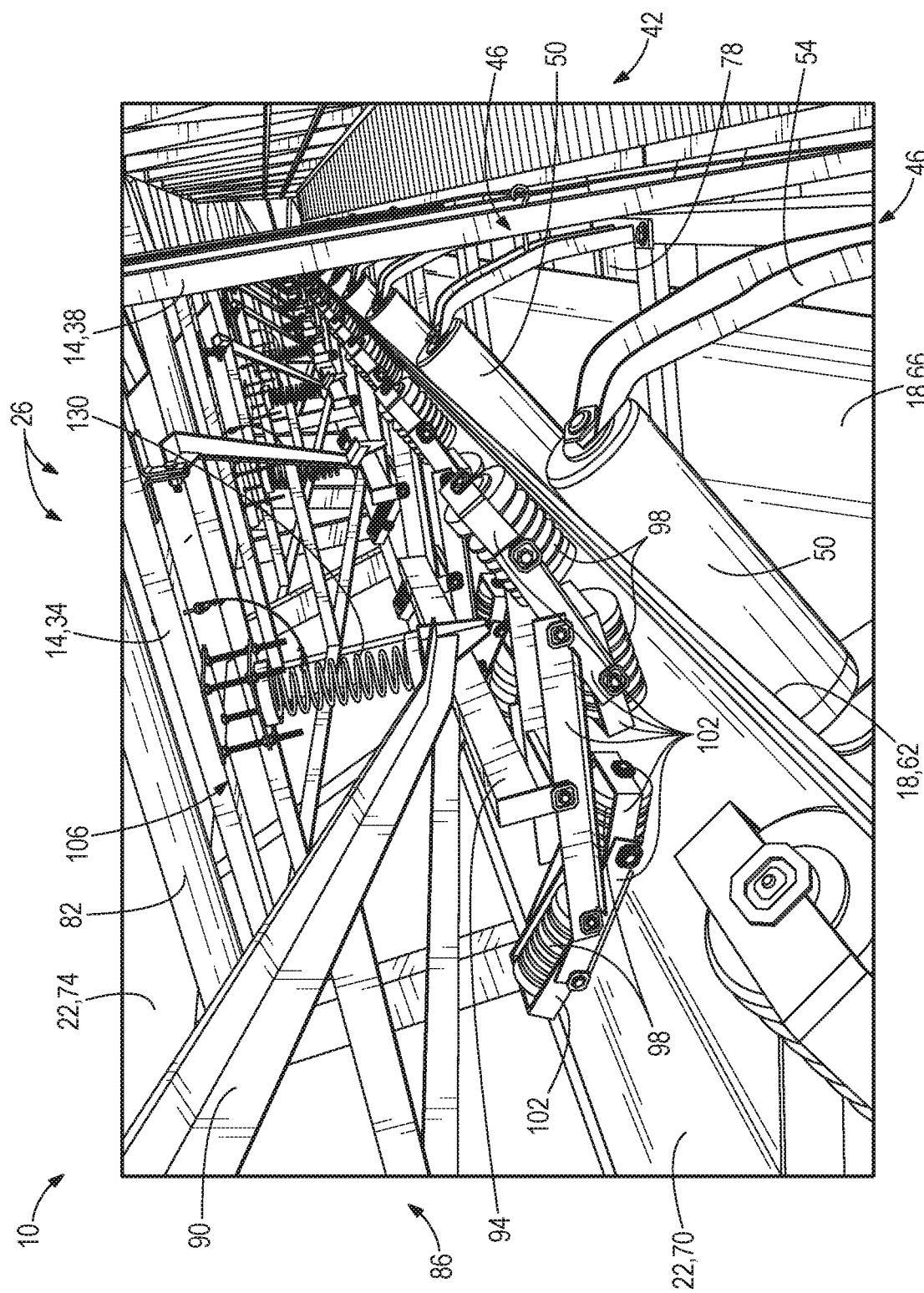
FIG. 2 is a perspective view of a portion of the high angle conveyor of FIG. 1.

With reference to FIG. 2, the high angle conveyor 10 includes a frame 14, a first or upper continuous conveyor belt 22, a second or lower continuous conveyor belt 18, and pressing assemblies 26. The lower conveyor belt 18 and the upper conveyor belt 22 are arranged in an endless sandwich configuration to convey material 30 (FIG. 4) between the lower and upper conveyor belts 18, 22 at large angles with respect to horizontal. For example, the high angle conveyor 10 may transport material 30 at a steep conveying angle up to 90° (vertical).

Figure 3:
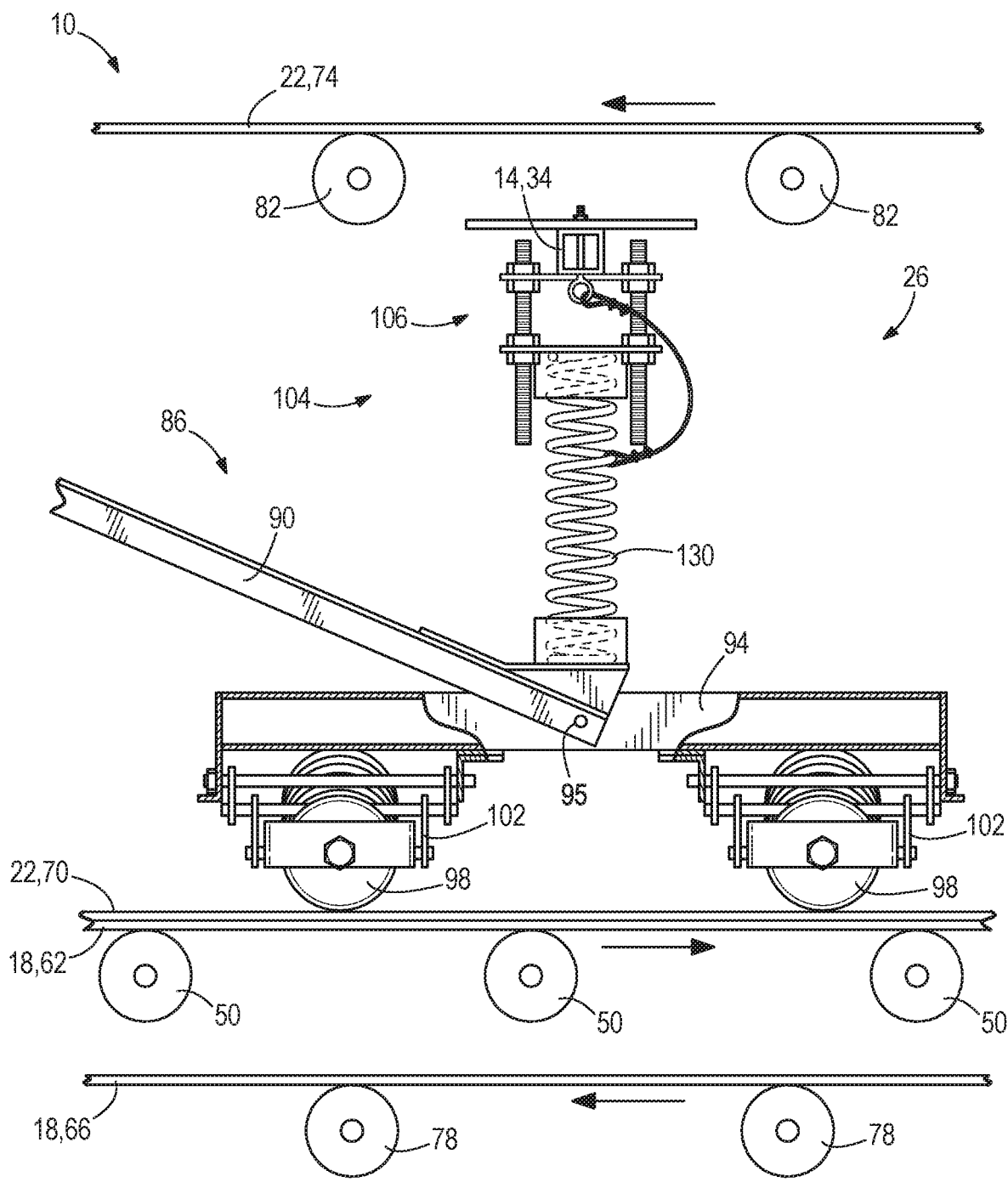
FIG. 3 is a side schematic view of a pressing assembly of the high angle conveyor of FIG. 1.
Figure 4:
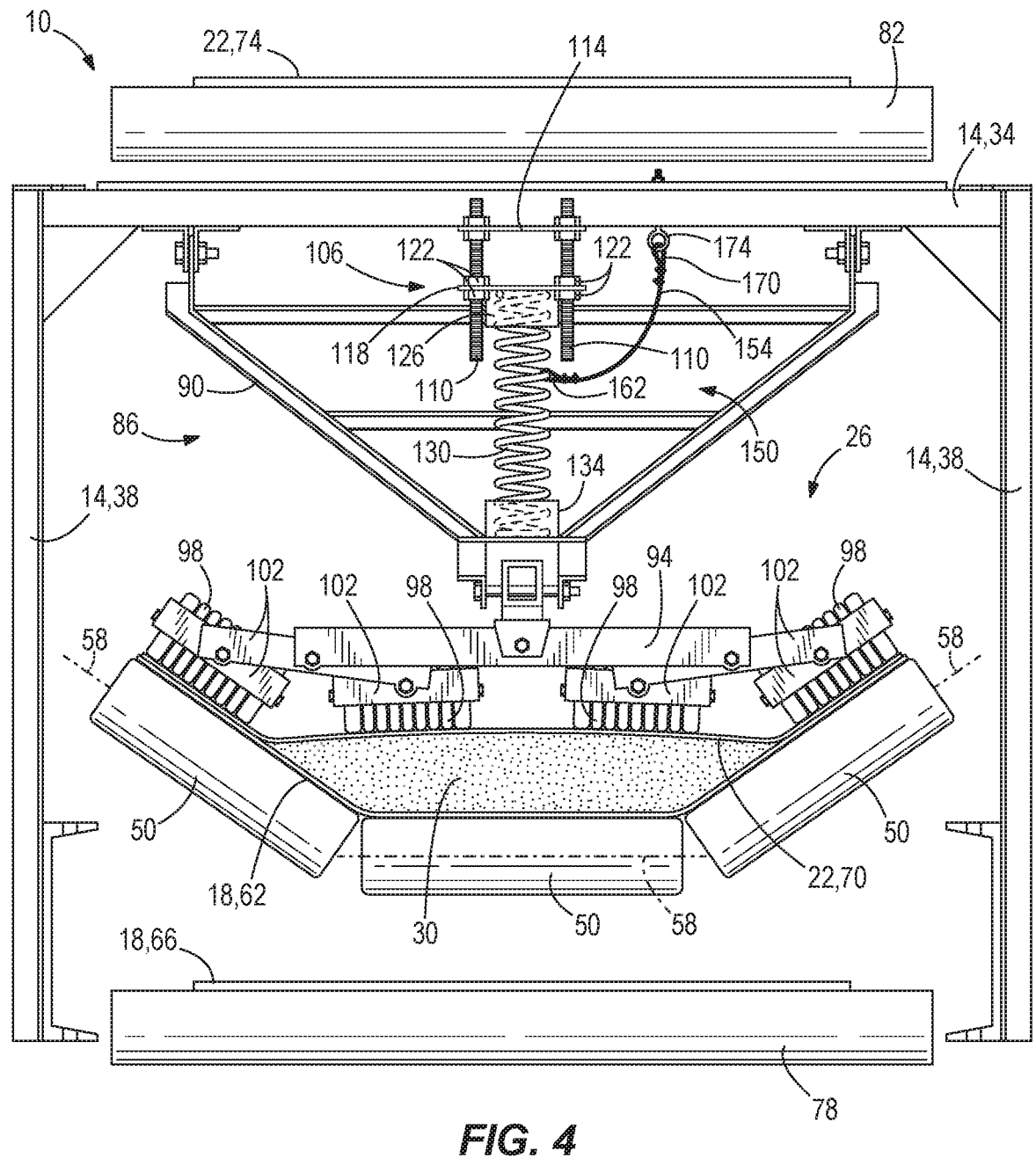
FIG. 4 is an end schematic view of the pressing assembly of FIG. 2.

With reference to FIGS. 2-4, the frame 14 of the high angle conveyor 10 extends at an angle with respect to horizontal and includes top frame members 34 and side frame members 38. In some embodiments, the frame 14 may include a staircase 42 that ascends alongside the lower and upper conveyor belts 18, 22. Idler roller assemblies 46 are positioned beneath the lower conveyor belt 18. The idler roller assemblies 46 each include idler rollers 50 that are rotatably supported on an idler frame 54. In the illustrated embodiment, the idler rollers 50 in each idler roller assembly 46 are positioned such that the rotational axes 58 (FIG. 4) of the idler rollers 50 are not aligned (e.g., the idler rollers 50 may rotate about axes 58 that are transverse to each other). Such an arrangement of the idler rollers 50 forms a trough shape into which the material 30 is received between the lower and upper conveyor belts 18, 22.

With reference to FIG. 3, both the lower conveyor belt 18 and the upper conveyor belt 22 are continuous conveyor belts. Specifically, the lower conveyor belt 18 includes a lower conveying belt portion 62 and a lower return belt portion 66, and the upper conveyor belt 22 includes an upper conveying belt portion 70 and an upper return belt portion 74. The lower return belt portion 66 is supported by lower belt support rollers 78. The upper return belt portion 74 is supported by upper belt support rollers 82 coupled to the frame 14.

With continued reference to FIGS. 2-4, the pressing assemblies 26 are coupled to the frame 14 and bias the upper conveyor belt 22 toward the lower conveyor belt 18, as described in further detail below. Each of the pressing assemblies 26 includes a bracket 86 pivotally coupled to the frame 14. The bracket 86 includes an A-frame 90 and a roller support 94. In the illustrated embodiment, the A-frame 90 is pivotally coupled to the frame 14 and the roller support 94 is pivotally coupled to the A-frame 90 at a pivot joint. In the illustrated embodiment, the pressing rollers 98 are arranged in two rows, with four pressing rollers 98 in each row. Specifically, the roller support 94 includes linkages 102 that rotatably support the pressing rollers 98.

Each of the pressing assemblies 26 further includes a spring assembly 104 (FIG. 3) having a spring support 106 coupled to the frame 14. In the illustrated embodiment, the spring support 106 is secured to the top frame member 34 by, for example, a welding process. The spring support 106 includes bolts 110, an upper plate 114, and a lower plate 118 that is adjustably positioned with respect to the upper plate 114 via adjustment of nuts 122 corresponding to the bolts 110. The spring assembly 104 in each of the pressing assemblies 26 also includes a spring 130 (e.g., a coil spring) positioned between the bracket 86 and the frame 14. In the illustrated embodiment, the spring 130 is positioned between the bracket 86 and the spring support 106.

Referring to FIG. 4, the illustrated spring support 106 further includes a cylindrical seat 126 (i.e., an upper spring seat) extending from the lower plate 118, in which an upper end of the spring 130 is received. In the illustrated embodiment, the cylindrical seat 126 is coaxially aligned with the spring 130. Similarly, the bracket 86 of the pressing assembly 26 includes a lower cylindrical spring seat 134 in which a lower end of the spring 130 is received. In the illustrated embodiments, the spring 130 is positioned within (i.e., seated in) the cylindrical spring seats 126, 134, however, in alternative embodiments, the spring 130 may be positioned around (i.e., on the outside of) the cylindrical spring seats 126, 134. The spring 130 urges the bracket 86 and the pressing rollers 98 toward the upper conveyor belt 22 (i.e., toward the upper conveying belt portion 70 and away from the spring support 106) such that the pressing assembly 26 biases the upper conveying belt 22 toward the lower conveyor belt 18, securing the material 30 therebetween. By adjusting the position of the lower plate 118 with respect to the upper plate 114 via the nuts 122 and bolts 110, the amount of pre-tensioning on the spring 130 can be adjusted by an operator. In other words, the amount of compression on the spring 130 in a resting state of the pressing assembly 26 can be adjusted by repositioning the lower plate 118 with respect to the upper plate 114. In some embodiments, repositioning of the lower plate 118 is also utilized to initially assemble and position the spring 130 between the cylindrical spring seats 126, 134.

With continued reference to FIG. 4, a spring retainer 150 couples the spring 130 to at least one of the frame 14, the bracket 86, or the spring support 106. In the illustrated embodiment, the spring retainer 150 is shown coupling the spring 130 directly to the frame 14 (i.e., the top frame member 34). The spring retainer 150 includes a cable 154 (e.g., a steel cable). A first end 162 of the cable 154 is coupled to the spring 130 and a second end 170 of the cable 154 is coupled to the frame 14 via an eye bolt 174. In other embodiments, the second end 170 of the cable 154 may be coupled to any suitable stationary structure around the spring 130.

Figure 5A:
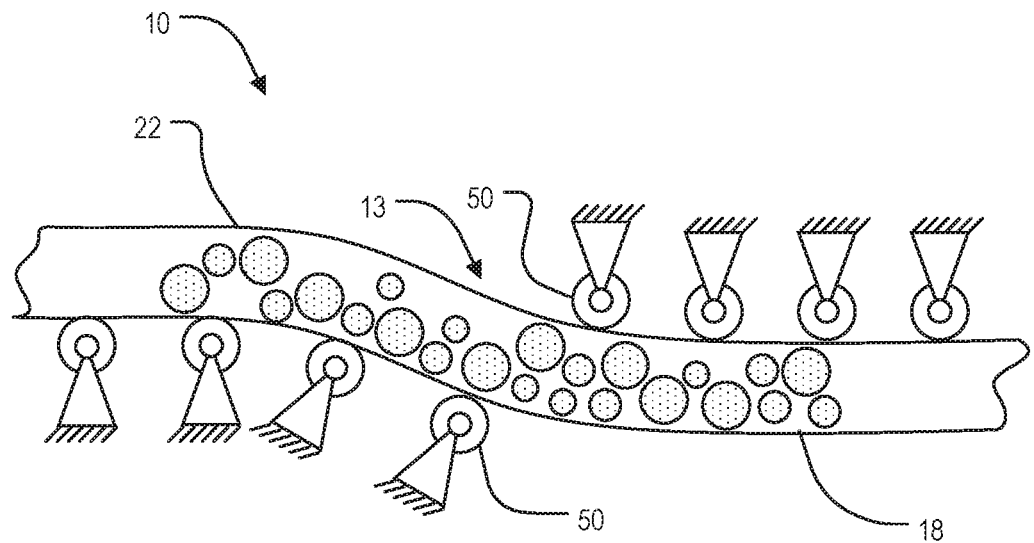
FIG. 5A is a side schematic view illustrating a normal material load passing through an inflection zone of the high angle conveyor of FIG. 1.
Figure 5B:
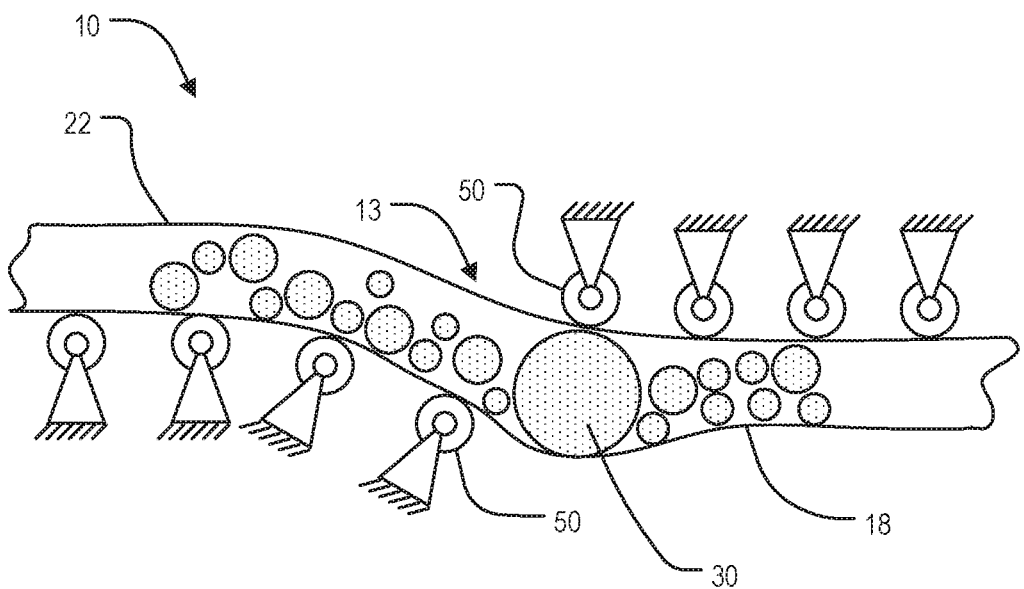
FIG. 5B is a side schematic view illustrating a large lump of material passing through the inflection zone of the high angle conveyor of FIG. 1.

FIGS. 5A-5B illustrate a portion of the high angle conveyor 10 including the inflection zone 13. As long as high angle conveyors, such as the high angle conveyor 10, operate within the manufacturer's specified capabilities, high angle conveyors function properly and according to design (FIG. 5A). However, problems operating high angle conveyors may arise when a high angle conveyor is loaded beyond its designed capacity (i.e., outside the specified capabilities). For example, in some instances a large object or lump of material 30 that exceeds the maximum specified lump size limits is placed between the upper and lower conveyor belts 18, 22 (FIG. 5B). In the inflection zone 13, the idler rollers 50 change sides, from supporting the lower conveyor belt 18 to the upper conveyor belt 22 or vice versa. On conventional high angel conveyors, the idler rollers 50 are fixed in position, and therefore there is a fixed distance between the idler rollers 50 that support the lower conveyor belt 18 and the idler rollers 50 that support the upper conveyor belt 22 in the inflection zone 13. If the large lump of material 30 has an overall dimension that exceeds this fixed distance, as illustrated in FIG. 5B, the lump of material 30 can cause damage to the conveyor belts 18, 22, idler rollers 50, or surrounding structures when passing through the inflection zone 13. This problem would not have been an obvious problem to those skilled in the art because large lumps of material 30 are not encountered during normal operating conditions. As such, this problem is being raised for the first time herein along with various embodiments of the disclosure to solve the problem.

Figure 6:
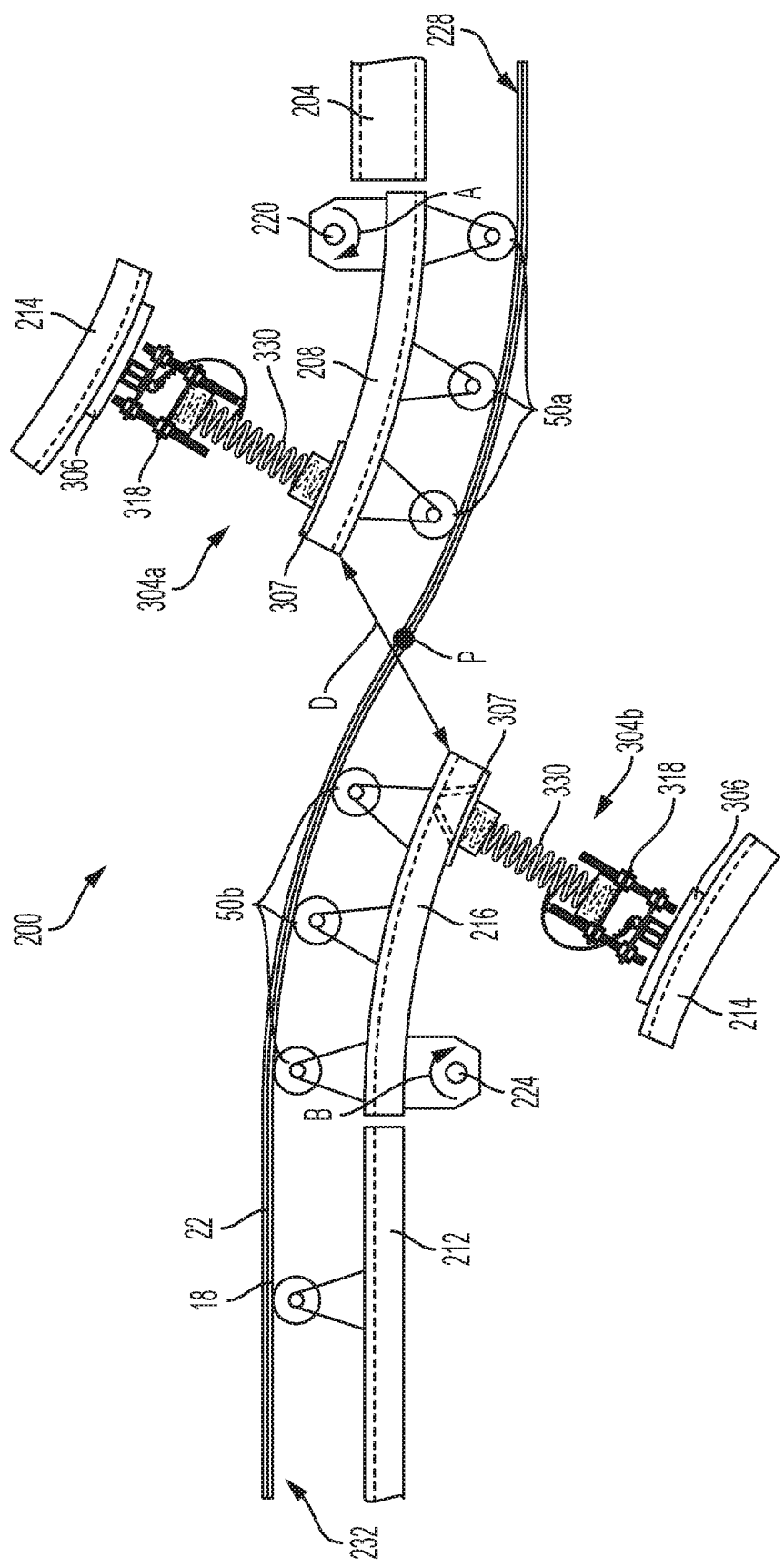
FIG. 6 is a side schematic view of a self-adjusting inflection zone assembly according to one embodiment, usable with the high angle conveyor of FIG. 1.

FIG. 6 illustrates a self-adjusting inflection zone assembly 200 of the high angle conveyor 10. The self-adjusting inflection zone assembly 200 includes a first main frame 204, a first pivot frame 208 pivotally coupled to the first main frame 204, a second main frame 212, and a second pivot frame 216 pivotally coupled to the second main frame 212. As such, the first pivot frame 208 is pivotable relative to the first main frame 204 about a first pivot axis 220, and the second pivot frame 216 is pivotable relative to the second main frame 212 about a second pivot axis 224. In the illustrated embodiment, the first and second pivot axes 220, 224 are parallel, and the first and second pivot axes 220, 224 are transverse to the conveying direction of the high angle conveyor 10.

In the illustrated embodiment, each of the pivot frames 208, 216 are pivotable relative to the respective main frames 204, 212 between an initial position (illustrated in FIG. 6) and an expanded position. In other embodiments, however, only one of the pivot frames 208, 216 may be configured to pivot, and the other frame may be a fixed or stationary frame.

With continued reference to FIG. 6, the first pivot frame 208 and the second pivot frame 216 are positioned on opposite sides of the inflection point P. For example, with respect to a conveying direction of the conveyor belts 18, 22, the first pivot frame 208 may be positioned on an upstream side of the inflection point P, and the second pivot frame 216 may be positioned on a downstream side of the inflection point P, or vice versa. The first and second pivot frames 208, 216 are also positioned on opposite sides of the conveyor belts 18, 22. In the illustrated embodiment, the first and second pivot frames 208, 216 have a curvilinear shape, curving away from the inflection point P.

A first plurality of idler rollers 50a is rotatably supported on the first pivot frame 208, and a second plurality of idler rollers 50b is rotatably supported on the second pivot frame 216. In some embodiments, additional idler rollers (not shown) may be provided on the first and second pivot frames 208, 216 to form a trough shape, like the arrangement of idler rollers 50 described above with reference to FIG. 4. In the illustrated embodiment, the first idler rollers 50a are positioned against a top side 228 of the upper conveyor belt 22, and the second idler rollers 50b are positioned against a bottom side 232 of the lower conveyor belt 18; however, in other embodiments, the first idler rollers 50a may be positioned against the bottom side 232, and the second idler rollers 50b may be positioned against the top side 228.

The illustrated support assembly 200 further includes a first spring assembly 304a coupled to the first pivot frame 208 and a second spring assembly 304b coupled to the second pivot frame 216. The first and second spring assemblies 304a, 304b bias the respective first and second pivot frames 208, 216 toward an initial or base position illustrated in FIG. 6. The initial position provides an optimal spacing between the first idler rollers 50a and the second idler rollers 50b to accommodate material within the high angle conveyor's 10 designed load capacity while maintaining pressure against the upper conveyor belt 22 and the lower conveyor belt 18 to inhibit the material spilling out from between the conveyor belts 18, 22. The initial position of each pivot frame 208, 216 is defined by engagement between the respective pivot frames 208, 216 and the main frames 204, 212, or alternatively with any other stop members engageable with the pivot frames 208, 216.

In the illustrated embodiment, the spring assemblies 304a, 304b are substantially identical to the spring assemblies 104 (FIG. 3) in the pressing assemblies 26 of the high angle conveyor 10. Accordingly, features and elements of the spring assemblies 304a, 304b corresponding with features and elements of the spring assembly 104 are given like reference numbers plus '200.' By using substantially identical spring assemblies 304a, 304b, 104 in the self-adjusting inflection zone assembly 200 and the pressing assemblies 26, the number of unique parts in the high angle conveyor 10 can be reduced. This reduces the cost of the high angle conveyor 10 and improves serviceability. In other embodiments, however, the spring assemblies 304a, 304b, 104 may not be substantially identical.

Referring to FIG. 6, each of the spring assemblies 304a, 304b includes a first spring support 306 coupled to a fixed frame 214 and a second spring support 307 coupled to the respective pivot frames 208, 216. A spring 330 extends between the spring supports 306, 307. Like spring support 106 described above with reference to FIG. 3, each spring support 306 may include an adjustable plate 318 that can be moved to vary a preload on the spring 330. In the illustrated embodiment, the spring 330 is a coil spring; however, other types of springs may be used. For example, in other embodiments, the spring 330 may be a leaf spring, a gas spring, or the like.

During ordinary operation, when an amount of material is being conveyed within the specified load or lump size capacity of the high angle conveyor 10 (e.g., FIG. 5A), the spring assemblies 304a, 304b maintain the pivot frames 208, 216 in their initial position (FIG. 6). In the event that a large lump of material 30 is loaded on to the high angle conveyor 10 (e.g., FIG. 5B), the lump of material 30 presses outward on the idler rollers 50a, 50b as it approaches the inflection point P. This pushes the pivot frames 208, 216 outward against the springs 330. The pivot frames 208, 216 pivot in the directions of arrows A and B, respectively to increase a distance D between the pivot frames 208, 216. This compresses the springs 330. When the lump of material 30 clears the inflection point P, the springs 330 urge the pivot frames 208, 216 back toward their initial position. Thus, the self-adjusting inflection zone assembly 200 allows large lumps of material 30 to pass through the inflection point P without damaging the idler rollers 50a, 50b or other parts of the high angle conveyor 10.

Figure 7:
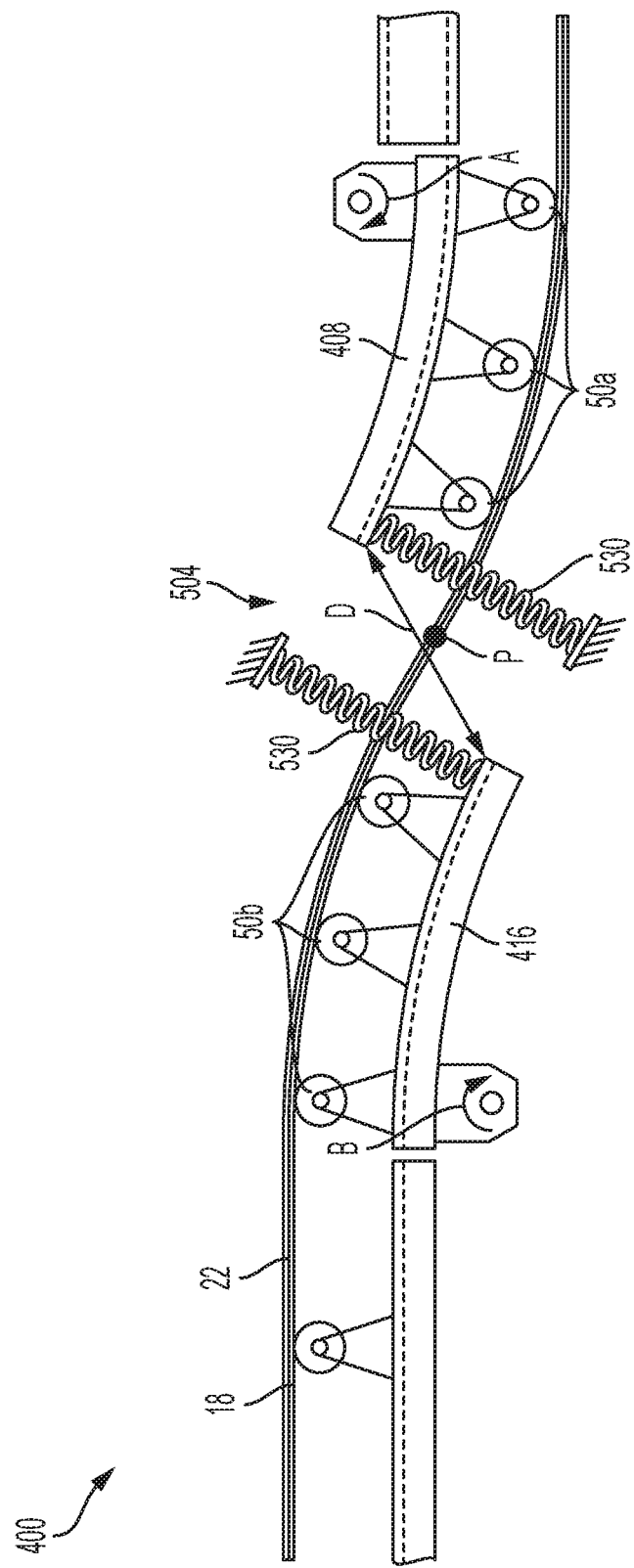
FIG. 7 is a side schematic view of a self-adjusting inflection zone assembly according to another embodiment, usable with the high angle conveyor of FIG. 1.

FIG. 7 illustrates a self-adjusting inflection zone assembly 400 according to another embodiment. The self-adjusting inflection zone assembly 400 is similar to the self-adjusting inflection zone assembly 200 described above with reference to FIG. 6, and features and elements of the inflection zone assembly 400 corresponding with features and elements of the inflection zone assembly 200 are given like reference numbers plus '200.' In addition, the following description focuses primarily on differences between the inflection zone assembly 400 and the inflection zone assembly 200.

The self-adjusting inflection zone assembly 400 includes tension spring assembly 504. The illustrated tension spring assembly 504 includes a plurality of tension springs 530 extending between the first pivot frame 408 and the second pivot frame 416. Because the tension springs 530 span between the pivot frames 408, 416, the springs 530 do not need to be coupled to a fixed frame, such as the fixed frame 214 (FIG. 6).

During operation, in the event that a large lump of material 30 is loaded on to the high angle conveyor 10 (e.g., FIG. 5B), the lump of material 30 presses outward on the idler rollers 50a, 50b as it approaches the inflection point P. This pushes the pivot frames 408, 416 outward, stretching the springs 530 (FIG. 7). The pivot frames 408, 416 pivot in the directions of arrows A and B, respectively, to increase a distance D between the pivot frames 408, 416. When the lump of material 30 clears the inflection point P, the springs 530 urge the pivot frames 408, 416 back toward their initial position, illustrated in FIG. 7. Thus, the self-adjusting inflection zone assembly 400 allows large lumps of material 30 to pass through the inflection point P without damaging the idler rollers 50*a*, 50*b* or other parts of the high angle conveyor 10.

Figure 8:
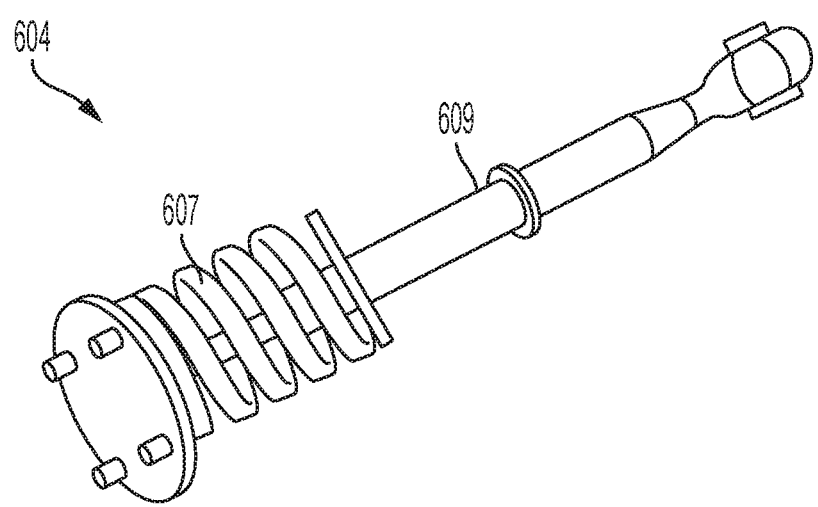
FIG. 8 is a perspective view of a spring assembly usable with a self-adjusting inflection zone assembly, such as the self-adjusting inflection zone assemblies of FIGS. 6 and 7.

FIG. 8 illustrates an alternative spring assembly 604 that may be incorporated into the flexible idler support assemblies 200, 400 described above with reference to FIGS. 6 and 7. The illustrated spring assembly 604 includes a spring 607 and a shock absorber 609 that form an integrated strut assembly. The shock absorber 609 absorbs impulses caused by encounters with large lumps of material, which may advantageously reduce wear, vibration, and noise during operation. In some embodiments, the spring assembly 604 may be an automotive MacPherson strut, for example. Use of a standard MacPherson strut in the flexible idler support assemblies 200, 400 may reduce cost and improve serviceability.

Figure 9:
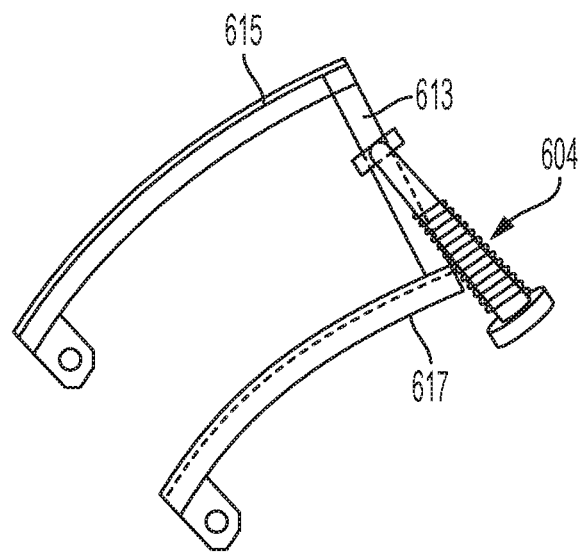
FIG. 9 is a perspective view of a frame coupled to the spring assembly of FIG. 8.
Figure 10:
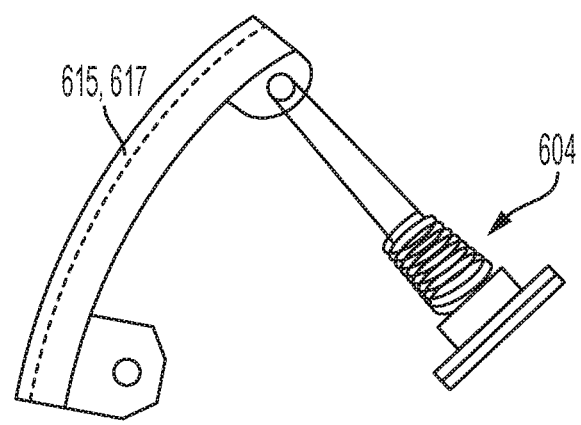
FIG. 10 is a side view of a frame coupled to the spring assembly of FIG. 8.

With reference to FIGS. 9 and 10, in some embodiments, the spring assembly 604 may be coupled to a bar 613 spanning two legs 615, 617 of a pivot frame, such as the pivot frames 208, 216 described above. As such, a single spring assembly 604 may be used for each pivot frame. In other embodiments, the spring assembly 604 may be directly coupled to one of the legs 615, 617 of the pivot frame. In such embodiments, two spring assemblies 604 may be used.

Various features and aspects of the present invention are set forth in the following claims.

What is claimed is:

1. A high angle conveyor comprising:
a first conveyor belt;
a second conveyor belt arranged in an endless sandwich configuration with the first conveyor belt to convey material between the first conveyor belt and the second conveyor belt in a conveying direction;
a first idler roller engaged with the first conveyor belt, the first idler roller being coupled to a first pivot frame; and
a second idler roller engaged with the second conveyor belt, the second idler roller being coupled to a second pivot frame;
wherein the first conveyor belt and the second conveyor belt define an inflection point between the first idler roller and the second idler roller, and
wherein the first and second pivot frames are each pivotable from an initial position toward an expanded position about an axis transverse to the conveying direction in response to a lump of material larger than a specified capacity of the high angle conveyor passing through the inflection point.

2. The high angle conveyor of claim 1, further comprising a first spring assembly coupled to the first pivot frame; and
a second spring assembly coupled to the second pivot frame,
wherein the first and second spring assemblies bias the respective first and second pivot frames toward the initial position.

3. The high angle conveyor of claim 2, wherein the first spring assembly includes a first spring that compresses as the first pivot frame pivots toward the expanded position, and wherein the second spring assembly includes a second spring that compresses as the second pivot frame pivots toward the expanded position.

4. The high angle conveyor of claim 2, wherein the first spring assembly includes a first spring that stretches as the first pivot frame pivots toward the expanded position, and wherein the second spring assembly includes a second spring that stretches as the second pivot frame pivots toward the expanded position.

5. The high angle conveyor of claim 2, further comprising a pressing assembly with a roller and a third spring assembly that biases the roller toward the second conveyor belt such that the pressing assembly biases the second conveyor belt toward the first conveyor belt.

6. The high angle conveyor of claim 5, wherein the first spring assembly, the second spring assembly, and the third spring assembly are substantially identical.

7. The high angle conveyor of claim 2, wherein at least one of the first spring assembly or the second spring assembly includes a shock absorber to absorb impulses caused by the lump of material passing through the inflection point.

8. The high angle conveyor of claim 1, wherein a distance between the first pivot frame and the second pivot frame increases as the first and second pivot frames pivot from the initial position toward the expanded position.

9. The high angle conveyor of claim 1, wherein the first pivot frame is positioned on an upstream side of the inflection point, and the second pivot frame is positioned on a downstream side of the inflection point such that the first pivot frame and the second pivot frame are spaced apart in the conveying direction.

10. A self-adjusting inflection zone assembly for a high angle conveyor including a first conveyor belt a second conveyor belt, a concave up section in which a slope of the high angle conveyor increases, a concave down section in which the slope of the high angle conveyor decreases, and an inflection point at an intersection between the concave up section and the concave down section, the self-adjusting inflection zone assembly comprising:
a first frame;
a first idler roller coupled to the first frame, the first idler roller engaged with the first conveyor belt at a position adjacent the inflection point on an upstream side of the inflection point;
a second frame;
a second idler roller coupled to the second frame, the second idler roller engaged with the second conveyor belt at a position adjacent the inflection point on a downstream side of the inflection point;
wherein at least one of the first frame or the second frame is pivotable from an initial position toward an expanded position to increase a spacing between the first frame and the second frame.

11. The self-adjusting inflection zone assembly of claim 10, further comprising a first spring assembly coupled to the first frame or the second frame, wherein the first spring assembly biases the first frame or the second frame toward the initial position.

12. The self-adjusting inflection zone assembly of claim 11, wherein the first spring assembly includes a first spring that compresses as the first frame or the second frame pivots toward the expanded position.

13. The self-adjusting inflection zone assembly of claim 11, wherein the first spring assembly includes a first spring that stretches as the first frame or the second frame pivots toward the expanded position.

14. The self-adjusting inflection zone assembly of claim 11, wherein the first spring assembly includes a shock absorber.

15. The self-adjusting inflection zone assembly of claim 11, wherein the first spring assembly is coupled to the first frame, and wherein the self-adjusting inflection zone assembly further comprises a second spring assembly coupled to the second frame.

16. The self-adjusting inflection zone assembly of claim 11, wherein the first spring assembly includes a first spring and a plate, and wherein the plate is adjustable to vary a preload on the first spring.

17. The self-adjusting inflection zone assembly of claim 10, wherein the first frame and the second frame are pivotable in opposite directions from the initial position toward the expanded position.

18. A high angle conveyor comprising:
a first conveyor belt;
a second conveyor belt arranged in an endless sandwich configuration with the first conveyor belt to convey material between the first conveyor belt and the second conveyor belt in a conveying direction, wherein the first conveyor belt and the second conveyor belt define an inflection point at which a curvature of the high angle conveyor changes from concave up to concave down;
a first idler roller engaged with the first conveyor belt at a position adjacent the inflection point on an upstream side of the inflection point, the first idler roller being coupled to a first frame; and
a second idler roller engaged with the second conveyor belt at a position adjacent the inflection point on a downstream side of the inflection point, the second idler roller being coupled to a second frame;
wherein the first frame and the second frame are positioned on opposite sides of the inflection point, and
wherein at least one of the first frame or the second frame is pivotable from an initial position toward an expanded position.

19. The high angle conveyor of claim 18, further comprising a first spring assembly coupled to the first frame or the second frame, wherein the first spring assembly biases the first frame or the second frame toward the initial position.

20. The high angle conveyor of claim 18, wherein the first frame or the second frame is pivotable from the initial position toward the expanded position in response to a lump of material larger than a specified capacity of the high angle conveyor passing through the inflection point.

* * * * *